United States Patent [19]

Henze et al.

[11] Patent Number: 4,573,168
[45] Date of Patent: Feb. 25, 1986

[54] BALANCED BIDIRECTIONAL OR PARTY LINE TRANSCEIVER ACCOMMODATING COMMON-MODE OFFSET VOLTAGE

[75] Inventors: Christopher P. Henze, Eagan; David F. Grimm, Apple Valley, both of Minn.

[73] Assignee: Sperry Corporation, New York, N.Y.

[21] Appl. No.: 646,269

[22] Filed: Aug. 31, 1984

[51] Int. Cl.[4] .......................... H04B 1/56; H04B 3/50
[52] U.S. Cl. ...................................... 375/36; 307/566; 307/318; 330/255
[58] Field of Search ............... 330/252, 255, 261, 262, 330/301; 375/36, 3; 307/455, 259, 285, 302, 317 R, 318, 542, 566; 370/27; 179/170.6, 170 NC, 170 R

[56] References Cited
U.S. PATENT DOCUMENTS 4,054,910 10/1977 Chou et al. ..................... 330/252
4,536,624 8/1985 Lyle ........................... 179/170 NC Primary Examiner—Robert L. Griffin
Assistant Examiner—Raymond C. Glenny
Attorney, Agent, or Firm—William C. Fuess; Glenn W. Bowen

[57] ABSTRACT

A biasing network comprising two nominal type GZ 2422D transorbs, two resistors nominal 68 ohms and one resistor nominal 110 ohms replicated at each combined differential current driver of nominal type Am26L531 and differential receiver of nominal type Am26L532, as jointly form a transceiver, which are upon a two-wire differential signal communication path allows communication to transpire at a common-mode offset voltage, nominally ±8 volts, which is greater than the differential signal voltage that the receiver does elsewise communicate at, and which common-mode offset voltage is at a level which might but for the biasing network damage or destroy the driver.

7 Claims, 13 Drawing Figures

BALANCED BIDIRECTIONAL OR PARTY LINE TRANSCEIVER ACCOMMODATING COMMON-MODE OFFSET VOLTAGE

This invention was made with Government support under Subcontract #146-852077-AK awarded under auspices of the United States Department of Defense. The Government has certain rights in this invention.

BACKGROUND OF THE INVENTION

The present invention deals generally with the biasing of a balanced party line or bidirectional transceiver so that such will operate for communication over a moderate range of offset voltages as measured at each of devices communicating bidirectionally or communicating as distributed upon a party line, which offset voltages are commonly referred to as common-mode voltages. The present invention specifically deals with a resistor and zener biasing network which allows a standard tri-state driver and accompanying standard receiver, collectively forming a transceiver, to operate within a common-mode voltage range (nominally plus or minus 8 volts) which is a greater common-mode voltage than that differential signal voltage which the transceiver does elsewise communicate at, and which common-mode voltage is at a level which might elsewise but for the biasing network damage or destroy the driver.

Standard high speed unidirectional quad receiver and driver circuit packages, such as the Am26LS31 tri-state driver and the Am26LS32 differential receiver available from Advanced Micro Devices, are commonly combined to produce balanced bidirectional transceiver circuits. In order to reduce the number of interconnecting input/output cables, "party line" configurations are normally used wherein each balanced tri-state driver/receiver is placed on the same pair of I/O conductors, thereby forming a transceiver and removing the requirement for separate transmit and receive paths between the collective transceivers. Several transceivers associated with different devices and distributed along the party line communication path may then all communicate on the selfsame single party line interconnecting path. If a balanced party line transceiver is to function as a useful input/output device in real world system, it must be able to operate over a moderate range of offset voltages as are existent between the chassis grounds of the host communicating devices. Such offset voltages arise because a universal ground is imperfect in a dispersed system, and certain voltage potential differences are prone to arise between the grounds at the various distributed devices. These offset voltages are referred to as common-mode voltages since it appears to each transceiver that a d.c. voltage bias is impressed upon the differential data signal. Most new military interfaces, including balanced party line configuration interfaces, are required to operate over a standard plus or minus 8 volts d.c. common-mode voltage range.

Integrated circuit packages, particularly quad-receiver integrated circuit packages, are not currently available which will operate with the military standard required plus or minus 8 volts d.c. common-mode voltage range. This is due to the inability of tri-state drivers, such as the aforementioned Am26LS31 of Advanced Micro Devices, to remain in a high impedance state, allowing the transceiver to operate at a receiver, in the presence of a common-mode voltage bias. Furthermore to problems with reception, if a negative common-mode voltage is applied to a driver in a high impedance state, then it will clamp at one diode drop below ground. If the current draw, due to the common-mode voltage, is sufficiently large from the driver in this state then parasitic elements will cause such driver to enter a "latch-up" condition which may damage or destroy the driver. These breakdown and latch-up points typically occur for tri-state drivers within those operating regions dictated by the common-mode voltage requirements.

SUMMARY OF THE INVENTION

The present invention is a resistor and zener diode biasing circuit utilizable with standard high speed unidirectional driver and receivers to allow such to operate as balanced bidirectional or party line transceivers in the presence of a common-mode offset voltage. Such a common-mode offset voltage between transceivers, an offset voltage which is measured between the grounds of the respective transceivers, arises when such transceivers are distributed within a bidirectional or upon a party line communication system at disparate physical locations. The biasing circuit of the present invention based on resistors and zener diodes (or transorbs) will suffice to support communications operability at greater than a ±8 volt d.c. common-mode offset voltage between any ones of the transceiver elements.

The transceiver apparatus of the present invention biased to exhibit improved immunity to a common-mode voltage, which common-mode voltage appears to such transceiver as a d.c. voltage bias impessed upon a differential data signal, consists of 7 elements. A differential current driver, which driver is commonly a tri-state driver which does source current only to the high output port thereof and does sink current only to the low output port thereof, constitutes the driver first element of the biased transceiver apparatus. Both the high output port and the low output port of such differential current driver are connected in a reverse-biased fashion through zener diodes, or transorbs, which constitute second and third elements of the biased transceiver, to local chassis ground. The high output port and the low output port of the differential current driver are additionally each connected by a resistor, such resistors constituting the fourth and fifth elements of the biased transceiver apparatus, to the respective first and second differential communications lines. To, and between, the first and second communications line is connected a differential receiver, which receiver is the sixth element of the biased transceiver apparatus, which is sensitive to received signals appearing as a differential voltage between such communication lines. Finally, as the seventh element of the biased transceiver apparatus, there is a cable impedance matching resistor connected between the first and second differential signal communication lines at the point of the connection of the differential receiver thereto. When plural such biased transceivers are connected at dispersed points upon a 2-wire communication network, bidirectional or party line communication may ensue even in the presence of a common-mode voltage greater than the normal differential signal voltage, and, indeed, of such a magnitude that such common-mode voltage could be damaging to the driver elements in the high-impedance state if such were not protected by the biasing circuit of the present invention.

In further elaboration of variance of, and variations in the application of, the improved transceiver circuit apparatus of the present invention, it is taught that transorbs are preferred to zener diodes in the biasing network for possessing lower intrinsic capacitance. Conventionally with the prior art, it is known that either the receiver element, or the driver element, may have the two communication lines connected thereto connected through zener diodes, or transorbs, to ground: thereby according enhanced immunity against Electromagnetic Pulse (EMP) or Electrostatic Discharge (ESD) for input and output communication. The transceiver with improved biasing of the present invention is taught to be compatible that both the driver and receiver elements thereof should be protected, by the connection of the transmission lines connected thereto via zener diodes (or transorbs) to ground, from Electromagnetic Pulse (EMP) or Electrostatic Discharge (ESD). The entire balanced bidirectional or party line transceiver apparatus of the present invention, including when protected against ESP or ESD, may be implemented from receiver, driver, transorb, and resistor elements which are commonly available in dual in-line packages. Thereby circuit complexity and circuit area is reduced while reliabiity is increased.

Correspondingly, it is a first object of the present invention that standard high speed unidirectional receiver and tri-state drivers should be biased in order to produce a balanced bidirectional or party line transceiver circuit which will operate over a range of common-mode offset voltage, which offset voltage can be greater than the differential signal voltage and which offset voltages are reflective of actual offset voltages incurred when transceivers are physically dispersed for operation in a bidirectional or party line input/output communication configurations.

It is a second object of the present invention that the biasing circuit which does permit that a balanced bidirectional or party line transceiver should accommodate common-mode voltage offset during operation for party line communication should also permit that upon the addition of further circuit elements that the transceiver be protectable, in both the driver and receiver elements thereof, against Electromagnetic Pulse (EMP) or Electrostatic Discharge (ESD).

It is a third object of the present invention that the entire balanced party line bidirectional transceiver which is biased to accommodate a common-mode offset voltage, and which optionally includes of EMP or ESD protection, should be entirely implementable from dual in-line packages. When so implemented, circuit complexity and area is reduced while reliability is increased. Subsidiary to this third object, certain selected components are preferred, including transorbs which do exhibit lower intrinsic capacitance than the zener diodes from which the circuit of the present invention is elsewise constructable.

DESCRIPTION OF THE PREFERRED EMBODIMENT

Figure 1:
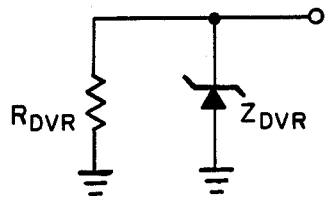
FIG. 1 shows an electrical model of the prior art tri-state driver when such is in a high impedance state.

The present invention is a resistor and zener diode biasing network interactional with standard high speed unidirectional receiver and (tri-state) driver circuits to produce, in combination, a balanced bidirectional, or party line, transceiver circuit which will operate for communication in the presence of a common-mode offset voltage. Such common-mode, offset, voltage may be greater than the breakdown voltage of the diode output of the transceiver driver element, and exceeds ±8 volts d.c. in the preferred embodiment of the invention.

The environment of the present invention is the well known interconnection for differential signal transmission via two wires. If transmission is from a single driver to a single transceiver then such is unidirectional. A bidirectional communication link requires a transceiver, consisting of a balanced tri-state driver and receiver, at each end of the communication link. In order to reduce the number of interconnecting transmission lines in a multi-device system, "party line" configurations are used. In a balanced party line system balanced tri-state driver and receiver elements, forming in combination a transceiver, are placed on the same pair of input/output conductive wires at the site of each communicating device within the system, thereby removing the requirement for separate transmit and receive paths between each pair of devices. The several transceivers each within the different devices then all communicate on the same two signal communication lines which form the same single interconnecting path.

If a balanced party line transceiver is to function in reliably effecting communication, it must be able to operate over a moderate range of offset voltages, which offset voltages are measured between the chassis grounds of the communicating devices. These offset voltages are referred to as common-mode voltages since it appears to each transceiver that a d.c. voltage bias is impressed upon the differential data signal. The common-mode, offset, voltages arise because the voltage differences between grounds at diverse devices physically distributed within a communications network cannot always be maintained at or near zero. Reflecting this fact, most new military interfaces, including party line configuration interfaces, are required to operate over a standard plus ±8 volts d.c. common-mode voltage range. For example, reference Critical Item Development Specification for Avionics Control Unit (CIDS/ACU), U.S. Department of Defense document number DAA331OPOOiC, June 3 1983, Revision C at Section: 3.3.2.5 *Ground Plane Interference* (page 40).

Receiver and driver circuits, nominally packaged four to an integrated circuit package, are currently available for party line communications applications. If a differential voltage signal can be delivered to a receiver circuit, which delivery will be seen to not be the case when a certain offset voltage bias is applied to a co-connected driver element, then such receiver elements are generally suitable for party line, and bidirectional, communication in the presence of offset voltages. However, no drivers are currently available in integrated circuit packages which drivers will operate with a ±8 volts d.c. common-mode voltage range. This inability of tri-state driver elements to operate in the presence of a common-mode voltage is due to the inability of such tri-state drivers, such as the Am26LS31 tristate driver available from Advanced Micro Devices, to remain in a high impedance state, allowing the transceiver to operate as a receiver, in the presence of a common-mode bias voltage.

Figure 2:
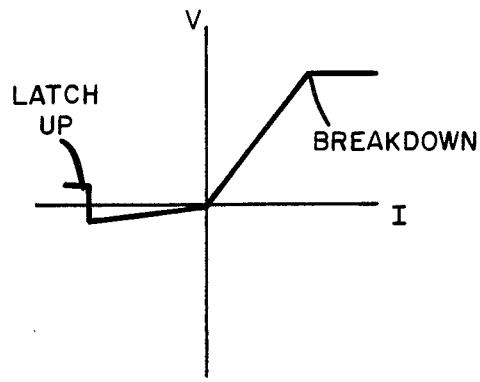
FIG. 2 shows the current/voltage (I/V) characteristic of the prior art tri-state driver modeled in FIG. 1 when such is in a high impedance state.

To consider this inability of a tri-state driver to permit a transceiver to operate as a receiver in the presence of a common-mode vias voltage, consider that the electrical model of a tristate driver in the high impedance state may be modeled by a resistor $R_{DVR}$ in parallel with a zener diode $Z_{DVR}$ as shown in FIG. 1. This tri-state driver as modeled in FIG. 1 will present only a high impedance to ground for positive voltages across the output which are less than the breakdown voltage of the zener diode. The voltage/current (V/I) characteristics of this circuit as shown in FIG. 2 shows, however, that if the breakdown voltage of the zener diode is exceeded then the driver will draw a great deal of current and may be damaged or destroyed. Also characteristic of the tri-state driver as electrically modeled in FIG. 1, and for which the voltage/current characteristic is shown in FIG. 2, is that if a negative voltage is applied to such tri-state driver in the high impedance state it will clamp such voltage at one diode drop below ground. However, if the current draw from the driver is increased then parasitic elements within such driver (not shown in FIG. 1) will cause a "latch-up" condition (shown in FIG. 2) which may also damage or destroy the driver. Both these breakdown and latch-up characteristics, and accompanying voltage levels, do not represent the insufficiency of any one tri-state driver but are typical of all tri-state drivers. The voltage level of the breakdown and latch-up points typically occurs within the operating region dictated by the common-mode voltage offset requirements.

Figure 3A:
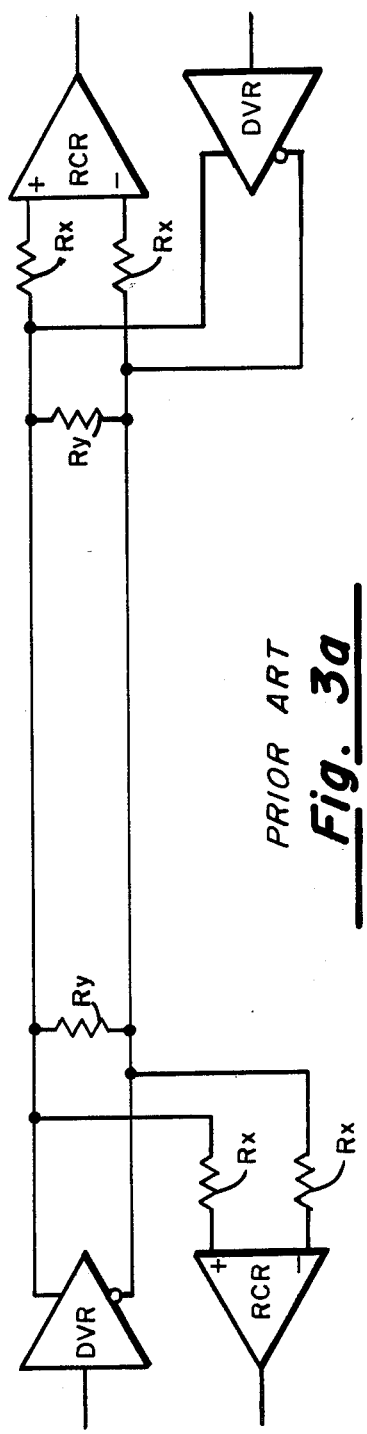
FIG. 3, consisting of FIG. 3a and FIG. 3b, respectively shows the prior art bidirectional and party line interconnection of tristate drivers and receivers, or transceivers.
Figure 3B:
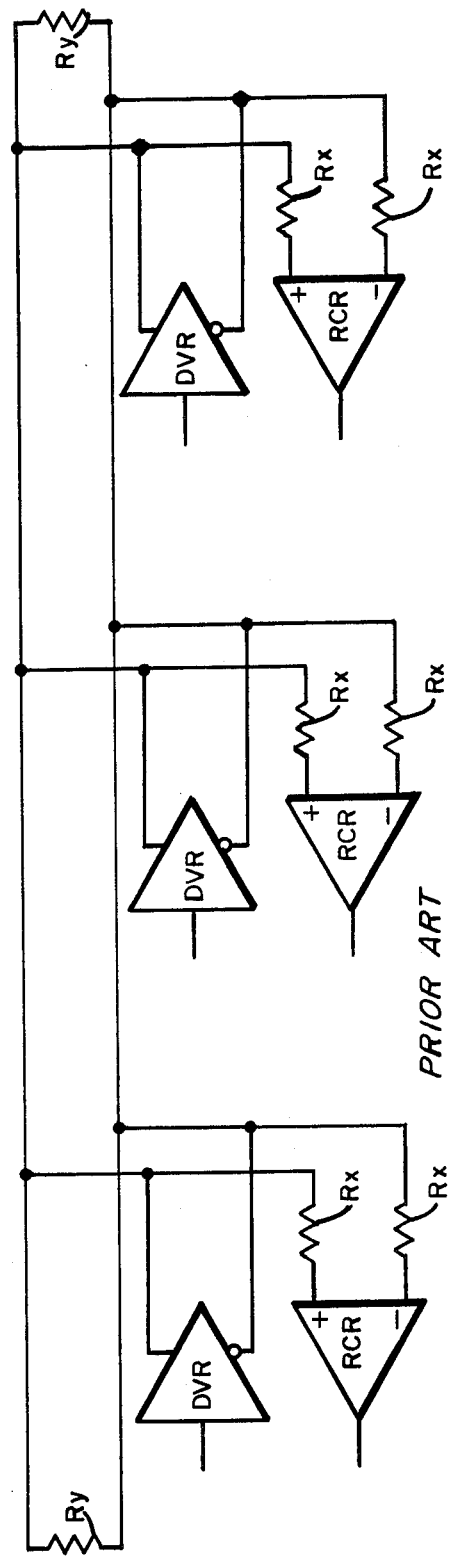

Continuing in the examination of the insufficiency of the prior art configuration transceiver circuit when required to operate in the presence of a common-mode voltage offset, the prior art circuits shown in FIG. 3a and FIG. 3b are respectively recommended for bidirectional and for party line intercommunication applications by integrated circuit manufacturers in the BIPOLAR MICROPROCESSOR LOGIC AND INTERFACE DATA BOOK, 1981, C Advanced Micro Devices, California at Section 4, page 31. In FIG. 3, elements labeled DVR are tri-state driver circuits such as type Am26LS31 from Advanced Micro Devices. Similarily, elements labeled RCR are receiver circuits such as type Am26LS32 also from Advanced Micro Devices. Each driver-receiver pair forms a transceiver. The resistances $R_X$ are current limiting resistances to the receiver RCR elements, and are of nominal value 1K ohms. The resistances $R_Y$ are termination resistances located at the physical end extremities of the communication lines, and are of nominal value equal to the intrinsic impedance of such communication line, nominally 110 ohms for twin wire communication lines. Difficulties are encountered with the transceiver circuit shown in FIG. 3 when attempting to communicate in the presence of a common-mode offset voltage. Particularly, difficulties are encountered with tri-state driver, such as typical part Am26LS31, when driving a load referenced to a common-mode voltage which is greater than either the breakdown or the latch-up voltage of such driver. In the cases of such common-mode voltage, both sides of the load may be biased at a higher, or at a lower, potential than the tri-state outputs, thereby requiring that both such tri-state driver outputs simultaneously sink, or simultaneously source, current. The tri-state driver, however, is not capable of functioning in such a manner since the high output is only capable of sourcing current and the low output may only sink current.

Figure 4A:
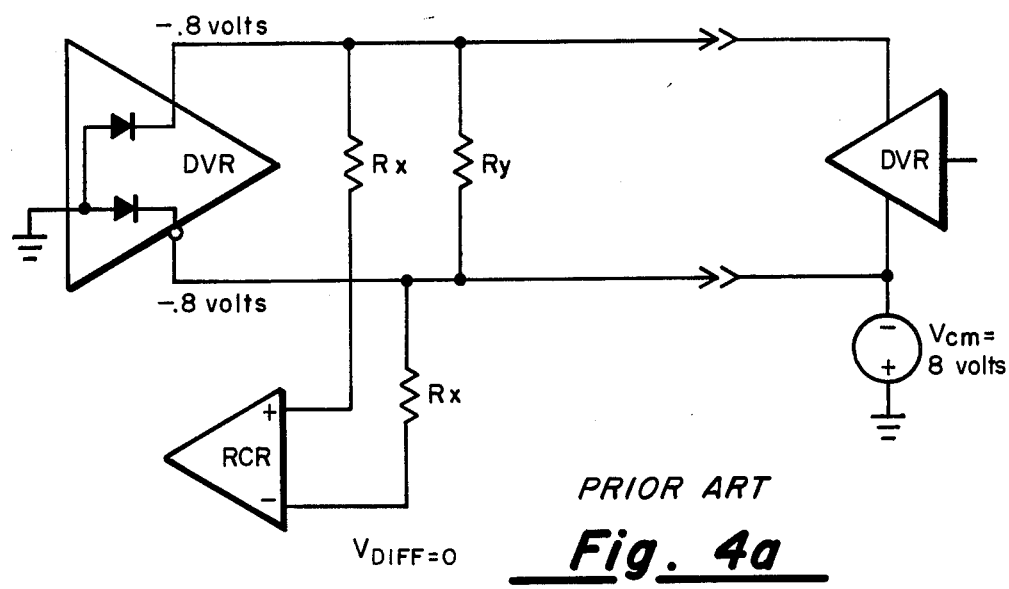
FIG. 4, consisting of FIG. 4a and FIG. 4b, respectively illustrate the inoperability for the receipt of data, and for the transmission of data, of the prior art transceiver circuit of FIG. 1, FIG. 2, and FIG. 3 when such is subjected to a respective negative and positive common-mode offset voltage.
Figure 4B:
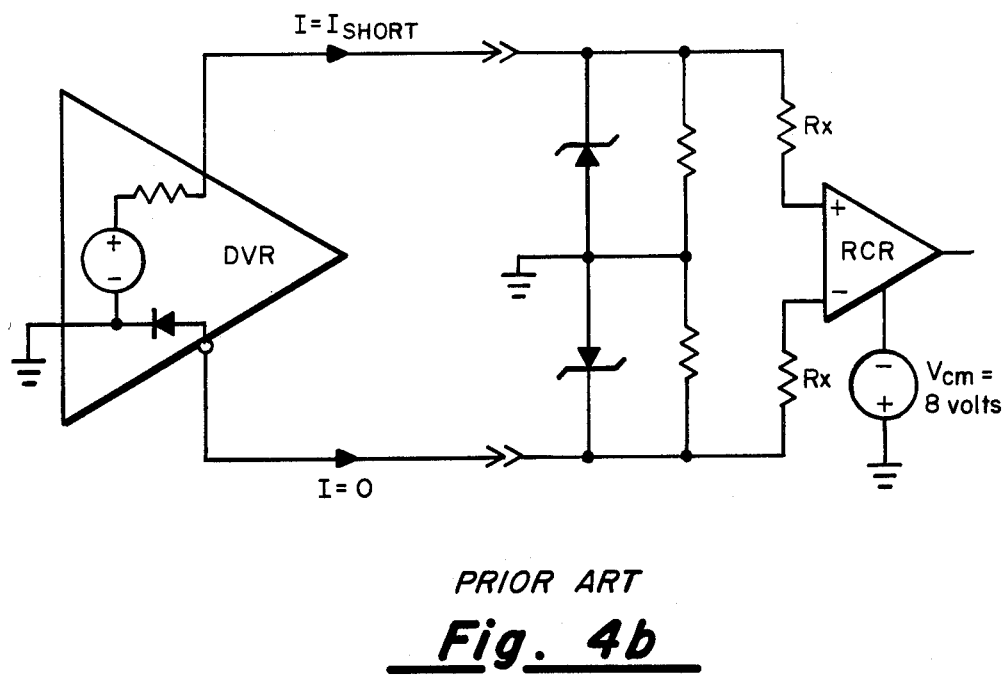

The problems that occur in a transceiver circuit, incorporating a tri-state driver, when such tri-state driver is called upon to function in the presence of a voltage offset which is respectively greater than the breakdown voltage, or less than the latch-up voltage, is respectively shown in FIG. 4a and FIG. 4b. The problems occurring due to drivers at the receiving end when such receiving end is at a positive common-mode offset voltage relative to the transmitting end is shown in FIG. 4a. Within FIG. 4a, the receiving end is at the left and the transmitting end is at the right. Likewise, the problems with drivers at the driving end in the presence of a common-mode voltage wherein such driving end is of higher voltage than the receiving end is illustrated in FIG. 4b. Within such 4b the transmitting, or driving, end is at the left and the receiving end is at the right.

For the case of receiving with the receiver at a positive common-mode offset voltage relative to the driver (the driver at a negative common-mode offset voltage to the receiver) illustrated in FIG. 4a, the receiving driver (desired to remain in a high impedance state) will inadvertently supply current from both its high and low output ports. For the typical Am26LS31 tri-state driver, both such ports will assume approximately minus 0.8 volts level in the presence of a common-mode voltage $V_{CM}$ equals 8 volts. The driven differential voltage signal $V_{DIFF\,IN}$ will not be seen at the receiver, wherein the differential voltage $V_{DIFF}$ will equal 0 volts due to the receipt of same, through current-limiting resistances $R_X$ of approximately 1K ohms, from the transmission lines at points proximate to the input and output ports of the tri-state driver which, in the high impedance (non-driving) state of such driver, both such ports are clamped at one diode drop below ground, meaning at an equal voltage.

The problems occurring with a driver at the driving, or transmitting, end when such driver is at a positive common-mode offset voltage relative to the receiving end (the receiver is at a negative common-mode offset voltage relative to the driver) is illustrated in FIG. 4b. When the driver, shown at the left of FIG. 4b, turns on then its high output sees essentially a short, resulting in current $I = I_{SHORT}$. The low side of the tri-state driver cannot source current, resulting in current $I = O$ amperes. Resultant to such shorted condition, wherein the driver is being called upon to source currents from both its high and low output ports, the driver will go into the latch-up condition and no differential output voltage will be developed. No signal will be seen through current limiting resistances $R_X$ at the receiver RCR, and no signal communication will ensue.

Figure 5:
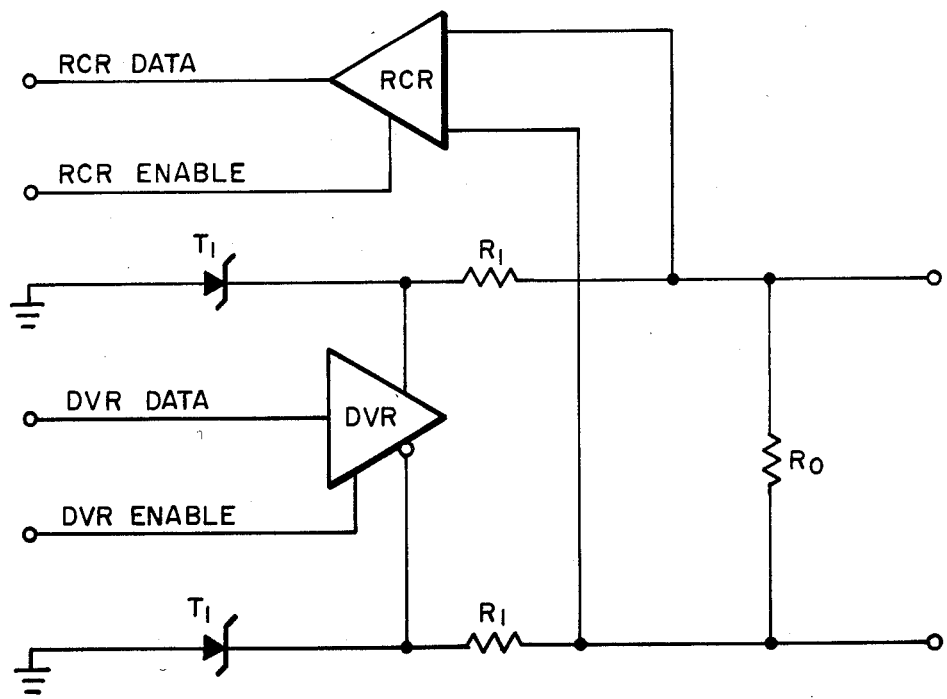
FIG. 5 shows the balanced party line, or bidirectional, transceiver of the present invention which does, by action of a resistor and zener diode based biasing network, allow communication at a common-mode offset voltage.

The circuit of the present invention allowing a transceiver, and particularly the driver element thereof such transceiver, to reliably operate for bidirectional, or for party line, communication in the presence of a common-mode voltage offset is shown in FIG. 5. The circuit employs a standard integrated circuit driver element DVR, such as Advanced Micro Devices part number Am26LS31, and integrated circuit receiver element RCR, such as Advanced Micro Devices part number Am26LS32. Additionally appended is a biasing network comprised of three resistors and two zener diodes. The biasing network protects the driver while it is in the high impedance state and provides current source and sink capability when the driver cannot so provide such current source and sink capability. In the preferred embodiment, all of the components used are available in dual in-line packages, thereby reducing the amount of space required for the improved transceiver implementation and allowing the use of automatic insertion manufacturing techniques.

The theory of the circuit of the present invention as shown in FIG. 5 is as follows. The resistor $R_0$ of nominal value 110 ohms serves to match the cable impedance while the transceiver is operating as a receiver. The resistors $R_1$ each of nominal value 68 ohms allow a differential signal to be preserved at the receiver when the driver is clamped negative or the zener diodes T1 are clamped positive. In addition resistors R1 provide current limiting for the driver when it is driving a similar transceiver (with its driver in a clamped state), thereby preventing the loss of the differential signal at such similar tranceiver. The zener diodes, or the low-capacitance transorb versions such zener diodes T1 of nominal type GZ 24224D available from General Semiconductor Industries, Inc., 2001 West 10th Place, Temple Ariz. 85281 are used to keep the driver out of latch-up and breakdown, and additionally to source and sink current when the driver cannot. The preferred breakdown voltage of zener diodes, or transorbs, T1 is 5 volts. All nominal resistor and transorb components used are available in dual in-line packages; thereby reducing the amount of space required per transceiver biased in accordance with the present invention and allowing the use of automated insertion manufacturing techniques.

Figure 6A:
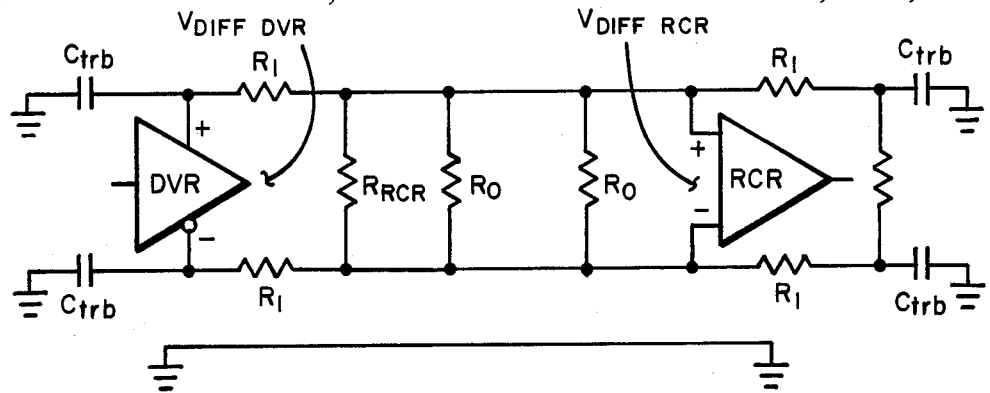
FIG. 6a shows the normal communication operation of two transceiver circuits of the present invention as shown in FIG. 5 in the case of zero volts common-mode voltage, including operation in consideration of the parasitic impedances of the biasing network of such circuit of the present invention as shown in FIG. 5.

During normal operation with no common-mode offset voltage the transceivers of the present invention as shown in FIG. 5 function as diagramed in FIG. 6a. The driving transceiver is shown at the left, of which only the driver element TVR is shown for simplicity's sake, while the receiving transceiver element is shown at the right, of which only the receiver element RCR is shown for simplicity's sake. The parasitic impedances of the present invention are, however, shown in FIG. 6a for the purpose of circuit analysis. The transorbs $T_1$ (shown in FIG. 5) at both of the driving and receiving ends are non-conducting in the presence of normal signal voltages and no common-mode offset voltage but do contribute a small parasitic capacitance illustrated as $C_{TRB}$. This parasitic capacitance, which diminishes the rise and fall times of signals transmitted upon the 2-wire communication network, should be as low as is practical. This is the reason the lower-capacitance transorbs are preferred in the preferred embodiment implementation of the present invention over zener diodes. Transorbs, as opposed to zener diodes, rae necessary for high-speed operation with rise and fall times less than 50 nanoseconds. The combination of current-sourcing driver elements and transorbs specified in the preferred embodiment of the present invention so support such high-speed operation with signal rise and fall times less than 50 nanoseconds (the capacitance of the wire communication not being considered).

Continuing in the electrical analysis of the circuit of the present invention when operated with no common-mode offset voltage as shown in FIG. 6a, parasitic resistances at the driving end resultant from the parallelly connected receiver element labeled as $R_{RCR}$, and at the receiver end resultant from the parallel connection of the driver element labeled as $R_{DVR}$, exist in the indicated locations. These impedances $R_{RCR}$ and $R_{DVR}$ are, however, 100 to 1000 times smaller than either $R_1$ or $R_0$ and may thusly be ignored in circuit analysis. Resultant to this simplification, the driving signal of the driver element DVR will be understood to be reduced by the voltage division occurring in the network of resistances $R_1$ and $R_0$. For normal conditions wherein $V_{CM} = 0$ as shown in FIG. 6a then: $V_{DIFF\ RCR} = V_{DIFF\ DVR} [R_0/(R_0 + 4R_1)]$. Additionally, the driver element DVR must also charge and discharge the parasitic capacitance $C_{TRB}$ at both the driving and receiving end of the communication link during every transition of the communication signal. If these capacitances become too large, they will draw excessive current from the driver DVR and slow the rise and fall times of signal communications upon the 2-wire network.

Figure 6B:
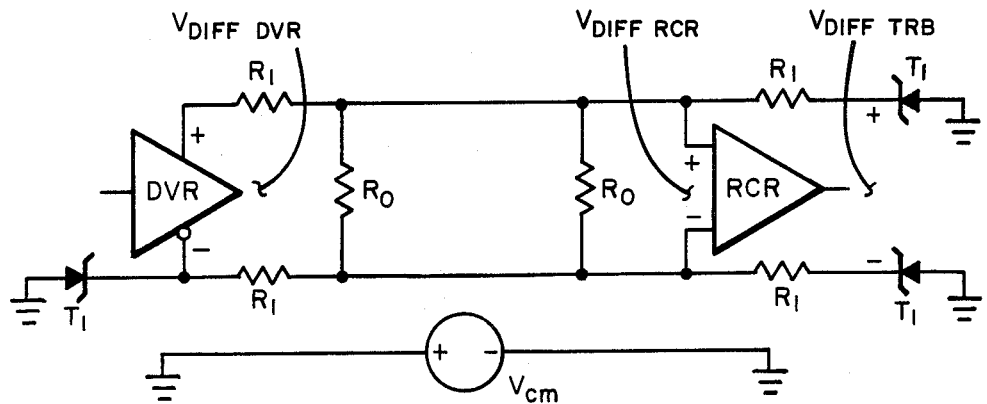
FIG. 6b and FIG. 6c respectively show the operation of the circuit of the present invention, shown in FIG. 5, to affect communication in the respective presence of a negative and a positive common-mode voltage, each measured from the ground of the receiving element of the receiving transceiver relative to the ground of the driving element of the driving transceiver.

Continuing with the analysis of the operation of the circuit of the present invention as shown in FIG. 5, the operation of such circuit when the driving transceiver is at a higher voltage potential equal to the common-mode offset voltage $V_{CM}$, then the receiving transceiver is shown in FIG. 6b. The common-mode offset voltage is represented as the voltage source $V_{CM}$ between the driving transceiver to the left and the receiving transceiver to the right. This common-mode offset voltage $V_{CM}$ is assumed to be sufficiently large so that both of the receiver transorbs, the two transorbs $T_1$ shown at the right of the diagram, are clamped at their breakdown voltage. In the low state wherein the driver element DVR will not source any current, its associated transorb $T_1$ (to the left of FIG. 6b) turns on in a forward-biased condition, thereby increasing the driver elements DVR differential voltage output by a saturation voltage drop plus a diode (or transorb) voltage drop. Since the driver transorb $T_1$ (shown to the left of FIG. 6b) is a high current device, its on voltage will less than the on voltage of the substrate diode of the driver DVR (reference diode $Z_{DVR}$ in the electrical model of the driver DVR shown in FIG. 1). This will ensure that the driver DVR transorb $T_1$ will conduct the majority of the current and thus prevent latch-up in the driver DVR. If the resistance $R_1$ is too small then the driver DVR may current limit: this determines the minimum size for resistance $R_1$.

Continuing in FIG. 6b wherein the operation of the present circuit is shown for a driver transceiver of positive common-mode offset voltage relative to a receiver transceiver, on the receiver RCR side resistance $R_1$ also determines the differential voltage which appears across receiver-side resistance $R_0$ (shown to the right of FIG. 6b). For a minimum drive signal as experienced at any point upon the communication network, resistance $R_1$ must be large enough so that the differential voltage seen across the receiver RCR (and across receiver resistance $R_0$) will be greater than the receiver's minimum threshold sensitivity. The specification of resistance $R_0$ of 110 ohms and resistances $R_1$ of 68 ohms so satisfy these dual requirements.

Figure 6C:
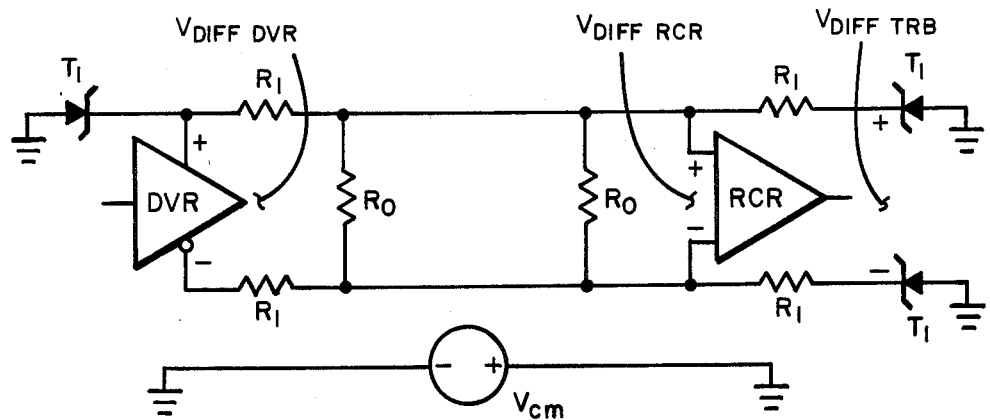

Continuing with the analysis of the performance of the circuit of the present invention as shown in FIG. 5, the application of such circuit when the driving transceiver is at a lower potential voltage than a receiving transceiver by a common-mode offset voltage between the grounds of such driving transceiver and receiving transceiver is shown in FIG. 6c. The common-mode offset voltage between the grounds of the driving transceiver, to the left, and the receiving transceiver, to the right, is illustrated by voltage $V_{CM}$, a negative voltage of the driving transceiver relative to the receiving transceiver. The high side of the driver DVR of the driving transceiver (shown at the left of FIG. 6c) may not sink current, therefore its associated transorb $T_1$ (shown at the left of FIG. 6c) will provide a current sink through being reversed biased. If the driver transceiver resistors $R_1$ are too small, the low side of the driver DVR will come out of saturation, which is unacceptable. However, most drivers can sink more current in the low state than they are able to source in the high state, so being pulled out of saturation is rarely a problem. Again, on the receiver RCR side (shown to the right of 6c), the differential voltage which appears across the receiver RCR, and across receiver resistance $R_0$ (shown at the right of FIG. 6c), will be determined by the values of receiver resistances $R_1$. As before, such differential voltage must be greater than the minimum threshold sensitivity of the receiver RCR, thereby determining a minimum size for the receiver resistance $R_1$. Again, when the occurrence of resistance $R_0$ at each of the driver and receiver transceivers equals 110 ohms, while each of the two occurrences of resistance $R_1$ at each of the driving and receiving transistors equals 68 ohms, then both these criteria will be satisfied.

For both the common-mode voltage situations illustrated in FIG. 6b and FIG. 6c the following relationship will be seen to hold. In the presence of Common-Mode Voltages large enough to cause receive side transorbs to conduct, either forward or reverse, then: $V_{DIFF\ RCR} = [V_{DIFF\ DVR} + V_{DIFF\ TRB}][R_0 / (2R_0 + 4R_1)]$ wherein $V_{DIFF\ RCR}$ is the differential voltage seen at the receiver RCR, $V_{DIFF\ DVR}$ is the differential voltage of the driver DVR at the driving end, and $V_{DIFF\ TRB}$ is the differential voltage of the driver at the receiving end; all as shown in FIG. 6b and FIG. 6c.

Figure 7A:
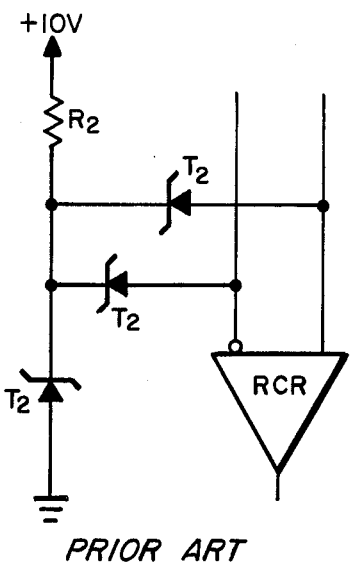
FIG. 7a and FIG. 7b respectively show the prior art circuitry which is protective of the receiving element, and of the driving element, of a transceiver against Electromagnetic Pulse or Electrostatic Discharge.
Figure 7B:
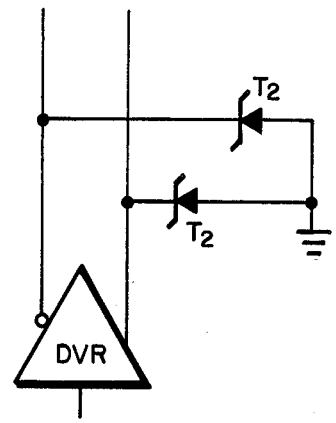
Figure 7C:
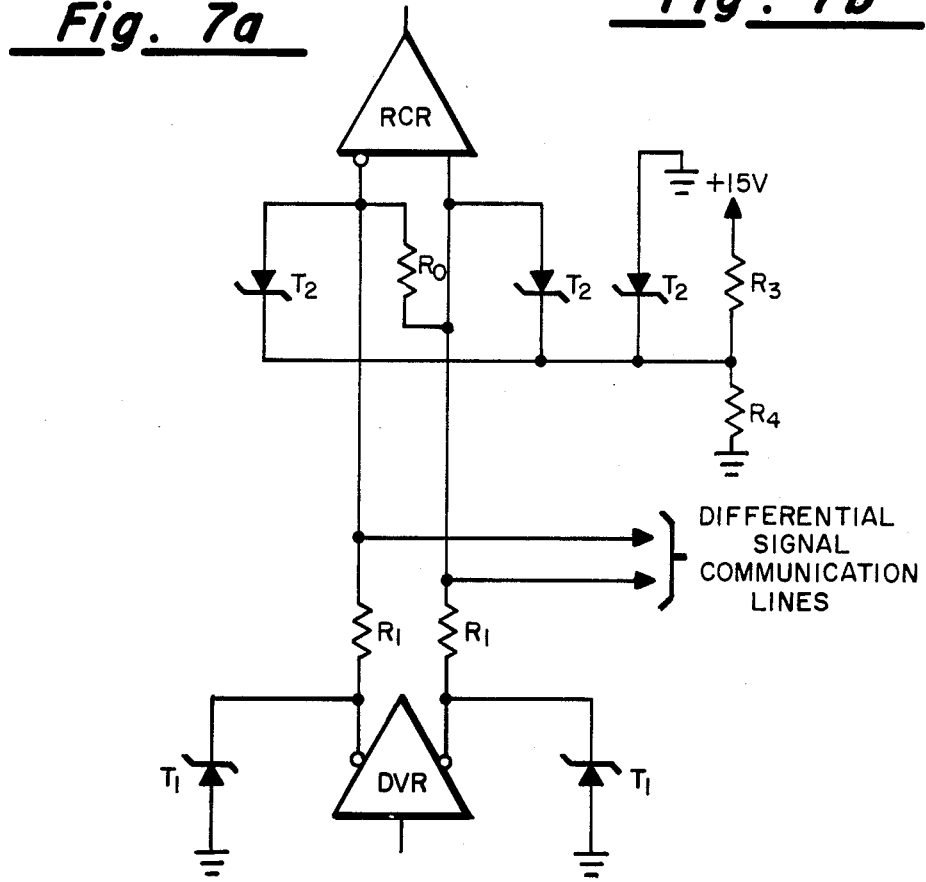
FIG. 7c shows the application of the prior art circuit elements for protection against Electromagnetic Pulse or Electrostatic Discharge of both driver and receiver elements to the biased transceiver circuit apparatus of the present invention.

The suitability of the biased transceiver of the present invention for being conventionally protected against Electromagnetic Pulse (EMP) or Electrostatic Discharge (ESD) is illustrated in FIG. 7, consisting of FIG. 7a through FIG. 7c. A particular and specific prior art circuit as taught by U.S. patent application Ser. No. 293,770 for ELECTROMAGNETIC PULSE CLAMPING CIRCUIT to the selfsame David F. Grimm who is a co-inventor of the present invention is shown in FIG. 7a. The protection of a unidirectional receiver RCR, which may be Advanced Micro Devices type Am26LS32B is by first transorbs $T_2$, biased as indicated, connecting each of the two differential signal transmission lines at the input to such receiver RCR to a common center point of a series-connected resistance $R_2$ and a single second transorb $T_2$ between a voltage source, nominally +10 volts d.c., and ground. The manner of such Electromagnetic Pulse or Electrostatic Discharge protection as taught within U.S. patent application Ser. No. 293,770, is particularly efficacious in that the first transorbs $T_2$ being connected to the signal lines are biased above ground, and therefore exhibit minimum capacitance to the protected signal lines. The two first and single second transorbs $T_2$ may all be of type GZ24224C obtainable from General Semiconductor Industries, Inc., 2001 West 10th Place, P.O. Box 3078, Tempe, Ariz. 85281. The current limiting resistor $R_2$ approximates the function of a pull-up resistor, and may be of any of a wide range of values, nominally equalling 1K ohms. Likewise, the general prior art connection of transorbs (or zener diodes) to the signal lines at the output of a driver element to protect such against Electromagnetic Pulse or Electrostatic Discharge is shown in FIG. 7b. Again, the driver DVR may be the aforementioned type Am26LS31 whereas each of the transorbs $T_2$ may be of the aforementioned type GZ24224C.

The application of the prior art priciples of protection against Electromagnetic Pulse or Electrostatic Discharge as are taught in FIG. 7a and FIG. 7b to the circuit of the present invention as shown in FIG. 5 produces that enhanced circuit variant of the present invention, protected against Electromagnetic Pulse or Electrostatic Discharge, shown in FIG. 7c. A single transceiver circuit is shown therein, which transceiver is communicative through the indicated DIFFERENTIAL SIGNAL COMMUNICATION LINES to like transceiver circuits in other devices. The biasing network comprised of two transorbs $T_1$, resistance $R_0$, and two resistances $R_1$, is of identical value to that taught within FIG. 5. Likewise, the Electromagnetic Pulse and/or Electrostatic Discharge protection circuit comprises the three transorbs $T_2$ which are of identical type to those identified in FIG. 7a and FIG. 7b, plus a voltage divider producing, from a nominal +15 volt d.c. supply, the preferred approximate +10 volt d.c. at the common point thereof such three transorbs $T_2$. Such voltage divider is illustrated to consist of resistances $R_3$ of nominal value 200 ohms and resistance $R_4$ of nominal value 420 ohms, which, in combination, do only serve to bias the transorbs $T_2$ at approximately +10 volts d.c. as was priorly taught in FIG. 7a. From the teaching of FIG. 7c, and from previous discussion concerning the selection of resistive components, it is obvious that the circuit of the present invention could be constructed to suffice for a range of signal, and a range of common-mode offset, voltages.

While a specific improved and preferred embodiment of the invention has been described in detail as a biasing circuit comprised of three resistances of two values, plus two transorbs, which do serve to allow a standard driver and standard receiver element, acting in conjoint as a transceiver, to accommodate a common-mode offset voltages in communication with like transceivers, it will be understood that the basic principles of the invention may be realized with alternative components. For example, the interchangeability of zener diodes and transorbs in realizing the circuit of the present invention has been discussed. Furthermore, although the invention has been particularly shown and described with reference to a particular preferred embodiment thereof, it will be understood by those skilled in the art that various alterations in form and detail may be made therein without departing from the spirit and scope of the invention. For example, the values of the components may be altered in allowing communication at different signal voltages, and in accommodation to different levels of common-mode offset voltage. It may be further noted that the circuit of the present invention does not prohibit of the addition of further circuit components to the transceiver elements, and to the signal lines connective thereto, particularly concerning protection against Electromagnetic Pulse or Electrostatic Discharge.

The embodiment of the invention in which an exclusive property or privilidge is claimed are defined as follows:

1. A biased transceiver apparatus having improved immunity to common-mode voltage which appears to said transceiver as a d.c. voltage bias impressed upon a differential data signal, said improved biased transceiver apparatus comprising:
  a differential current driver means for sourcing current to a high output port and for sinking current to a low output port;
  first zener diode means anode connected to ground and cathode connected to said high output port of said differential current driver means for IF said ground is at more positive voltage than said high output port THEN conducting current from said ground to said high output port ELSE IF said high output port is at a positive voltage less than a fixed breakdown voltage above said ground THEN not conducting current ELSE IF said high output port is at a positive voltage greater than said fixed breakdown voltage above said ground THEN conducting current from said high output port to said ground;
  second zener diode means anode connected to ground and cathode connected to said low output port of said differential current driver means for IF said ground is at more positive voltage than said low output port THEN conducting current from said ground to said low output port ELSE IF said low output port is at a positive voltage less than a fixed breakdown voltage above said ground THEN not conducting current ELSE IF said low output port is at a positive voltage greater than said fixed breakdown voltage above said ground THEN conducting current from said low output port to said ground;
  a differential receiver means connected between a first communications line one and a second communications line one of a pair of differential signal communications lines for receiving signals appearing as a differential voltage between said first communications line and said second communications line;
  cable impedance matching resistance means connected between said first communications line and said second communications line at the point of said differential receiver means for providing a first resistance between said first communications line and said second communications line wherein said first resistance does substantially match the real component of the impedance of said pair of differential signal communications lines;
  first resistor means between said high output port of said differential current driver means and said first communications line one of said pair of differential signal communications lines for providing a second resistance between said high output port of said differential current driver means and said first communications line wherein said second resistance is sufficient that current limiting is provided of current sourced from said high output port of said differential current driver means to said first communications line while simultaneously the ratio of said second resistance to said first resistance does allow that a said differential voltage adequate for said receiving by said differential receiver means will appear across said cable impedance matching resistor means;
  second resistor means between said low output port of said differential current driver means and said second communications line one of said pair of differential signal communications lines for providing a second resistance between said low output port of said differential current driver means and said second communications line wherein said second resistance is sufficient that current limiting is provided of current sinked from said first communications line driver means to said low output port of said differential current while simultaneously the ratio of said second resistance to said first resistance does allow that a said differential voltage adequate for said receiving by said differential receiver means will appear across said cable impedance matching resistor means.

2. The biased transceiver apparatus of claim 1 wherein said first zener diode means further comprises:
  a zener diode
and wherein said second zener diode means further comprises:
  a zener diode.

3. The biased transceiver apparatus of claim 2 wherein said first zener diode means further comprises:
  a zener diode of breakdown voltage approximately 5 volts;
and wherein said second zener diode means further comprises:
  a zener diode of breakdown voltage approximately 5 volts.

4. The biased transceiver apparatus of claim 1 wherein said first zener diode means further comprises:
  a transorb of low capacitance;
and wherein said second zener diode means further comprises:
  a transorb of low capacitance.

5. The biased transceiver apparatus of claim 4 wherein said first zener diode means further comprises:
  a transorb of low capacitance and of breakdown voltage approximately 5 volts.
and wherein said second zener diode means further comprises:

a transorb of low capacitance and of breakdown voltage aproximately 5 volts.

6. The biased transceiver apparatus of claim 1 which further comprises:

a common voltage source;

a first transorb first-connected to said first communications line at the point of said differential receiver means plus a second transorb first-connected to said second communications line at the point of said differential receiver means, both said first and said second transorb second-connected to said common voltage source WHEREIN said common voltage source does back bias both said first and said second transorb into nonconduction during all normal signals upon said first communication line and said second communication line; and a third transorb first-connected to said common voltage source and second-connected to ground WHEREIN said third transorb is normally back biased by said common voltage and non-conducting;

WHEREIN IF overvoltage conditions due to electromagnetic pulse or electrostatic discharge exist upon said first communication line or said second communication line or both said first and said second communication lines THEN said first transorb or said second transorb or said third transorb are in breakdown conduction clamping said first and said second communication lines at voltage levels insufficiently great to induce failure of said differential receiver means.

7. The biased transceiver apparatus of claim 6 wherein:

said first transorb is anode-connected to said first communications line and cathode-connected to said common voltage source;

said second transorb is anode-connected to said second communications line and cathode-connected to said common voltage source;

said third transorb is cathode-connected to said voltage source and anode-connected to ground; and said voltage source is a current limited positive voltage source.

* * * * *